United States Patent
Pinkus et al.

(10) Patent No.: US 8,620,069 B1
(45) Date of Patent: Dec. 31, 2013

(54) AUTOMATIC TRIANGLE ORIENTATION DETECTION ALGRORITHM

(75) Inventors: Alan R. Pinkus, Bellbrook, OH (US); David W. Dommett, Beavercreek, OH (US); Harry Lee Task, Tucson, AZ (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 433 days.

(21) Appl. No.: 13/025,570

(22) Filed: Feb. 11, 2011

(51) Int. Cl.
   *G06K 9/00* (2006.01)
(52) U.S. Cl.
   USPC .......................................... 382/165; 382/181
(58) Field of Classification Search
   None
   See application file for complete search history.

(56) References Cited

U.S. PATENT DOCUMENTS

| | | | |
|---|---|---|---|
| 4,607,923 A | 8/1986 | Task et al. | |
| 4,615,594 A | 10/1986 | Task | |
| 4,618,231 A | 10/1986 | Genco et al. | |
| 4,843,568 A * | 6/1989 | Krueger et al. | 382/100 |
| 5,880,814 A | 3/1999 | McKnight et al. | |
| 7,537,343 B2 | 5/2009 | Kanazawa et al. | |
| 7,771,051 B2 | 8/2010 | Hirji | |
| 7,819,524 B2 | 10/2010 | Kanazawa et al. | |
| 8,083,353 B2 | 12/2011 | Hytowitz | |
| 8,184,923 B2 | 5/2012 | Hayaiawa et al. | |
| 8,197,065 B2 | 6/2012 | Yoo et al. | |
| 8,324,564 B1 | 12/2012 | Pinkus et al. | |
| 2006/0098877 A1 * | 5/2006 | Barnes et al. | 382/203 |
| 2006/0204079 A1 * | 9/2006 | Yamaguchi | 382/154 |
| 2006/0227144 A1 * | 10/2006 | Bleiweiss | 345/502 |
| 2010/0322489 A1 * | 12/2010 | Tizhoosh et al. | 382/128 |

OTHER PUBLICATIONS

Pinkus, A. R., et al., "Quad-Emissive Display for Multi-spectral Sensor Analyses.", Proceedings of SPIE, Orlando, FL, vol. 7336-50 (2009).
Task, H. L., et al., "Theoretical and Applied aspects of night vision goggle resolution and visual acuity assessment.", Helmet- and Helmet-Mounted Displays: Technologies & Applications, Proceedings of SPIE, Orlando, FL, vol. 6557, 65570P-1-11 (2007).
Pinkus, A. R., et al., "Reproducibility Limits of Night Vision Goggle Visual Acuity Measurements", SAFE Journal, 30(1) (2000).
Pinkus, A. R., et al., "Measuring observers' visual acuity through night vision goggles.", SAFE Symposium Proceedings 1998, 36th Annual Symposium, pp. 1-11 (1998).
Bijl, P., et al., "A critical evalutaion of test patterns for EO system characterization.", SPIE Proceedings vol. 4372, pp. 27-38 (2001).

(Continued)

*Primary Examiner* — Sean Motsinger
(74) *Attorney, Agent, or Firm* — AFMCLO/JAZ; Charles Figer

(57) ABSTRACT

A method, apparatus and program product are presented for detecting an image. Ring contour images are created by blurring the image, posterizing the blurred image at a plurality of levels and creating the ring contour images from each of the posterized images. Convex hull images are created by creating a plurality of corner images from corners within the image located by at least two different corner algorithms, finding a bounding rectangle that encompasses the ring contour images, cropping the corner images using the bounding rectangle, applying a threshold to the cropped corner images, and creating the convex hull images by generating a convex hull from the corners in each of the cropped corner images. A plurality of triangles is created by fitting a triangle with an orientation to the ring contour images and the convex hull images. Finally the orientation of the triangle is determined from the plurality of triangles.

20 Claims, 9 Drawing Sheets

(56) References Cited

OTHER PUBLICATIONS

Hogervorst, M. A., et al., "Capturing the sampling effects: a TOD sensor performance model.", SPIE Proceedings vol. 4372, pp. 62-73 (2001).

McHugh, S. W., et al., "TOD test method for characterizing electro-optical system performance.", SPIE Proceedings vol. 4372, pp. 39-45 (2001).

Bailey, I., et al., "New design principles for visual acuity letter charts.", American Journal of Optometry and Physiological Optics, 53, pp. 740-745 (1976).

Brown, R., et al., "New directions in psychology I", pp. 89-155, New York, Rinehart and Winston (1962).

Farrell, R., et al., "Design handbook for imagery interpretation equipment.", pp. 3.1-9-3.1-18, 4.3-60-4.3-61, 8.0-17-8.0-18, Seattle, Boeing Aerospace Company (1984).

Bijl, P., et al., "Guidelines for Accurate TOD Measurement.", SPIE Proceedings, vol. 3701, pp. 14-25 (1999).

Military Specification MIL-L-85762A, "Night vision imaging system (NVIS) compatible interior aircraft lighting." (Jan. 24, 1986).

Miller, R., et al., "Comparative visual performance with ANVIS and AN/PVS-5A night vision goggles under starlight conditions.", Technical Report No. USAFSAM-TR-84-28, USAF School of Aerospace Medicine, Brooks AFB, TX (1984).

National Academy of Sciences, "Recommended standard procedures for the clinical measurement and specification of visual acuity.", Report of Working Group 39, Committee on Vision, Advances in Ophthalmology, 41, pp. 103-148 (1980).

Pinkus, A. R., et al., "The effects of aircraft transparencies on night vision goggle-mediated visual acuity.", SAFE Symposium Proceedings 1997, 35th Annual Symposium Sep. 8-10, pp. 93-104 (1997).

Simpson, W. A., "The Step method: A new adaptive psychophysical procedure.", Perception & Psychophysics, 45(6), pp. 572-576 (1989).

Stefanik, R., "Image intensifier system resolution based on laboratory measured parameters.", Technical Report No. 0112, Night Vision and Electronic Sensors Directorate, Ft. Belvoir, VA (Aug. 1994).

Task, H. L., "An evaluation and comparison of several measures of image quality for television displays.", Technical Report No. AMRL-TR-79-7, NTIS, Alexandria, VA (1979).

Wiley, R., "Visual acuity and stereopsis with night vision goggles.", Technical Report No. USAARL 89-9, U.S. Army Aeromedical Research Laboratory, Ft. Rucker, AL (1989).

Bijl, P., "TOD Predicts Target Acquisition Performance for Staring and Scanning Thermal Images.", SPIE Proceedings, vol. 4030, pp. 96-103 (2000).

"Reproducibility of Night Vision Goggle Visual Acuity Measurements Using Landolt C's," Pinkus et al., SAFE Journal 30 (1), 2000, pp. 1-6.

"Capturing the sampling effects: a TOD sensor performance model," Hogervorst, M.A et al., SPIE Proceedings, vol. 4372, 2001, pp. 62-73.

"Quad-Emmissive Display for Multi-Spectral Sensor Analyses," Pinkus et al., SPIE, vol. 7336-50, 2009, pp. 1-10.

\* cited by examiner

| Distance | IR | NIR | VIS |
|---|---|---|---|
| 5.3 m | 100 | 100 | 100 |
| 7.1 m | 100 | 100 | 100 |
| 9.5 m | 100 | 100 | 100 |
| 12.5 m | 100 | 75 | 100 |
| 16.9 m | 75 | 50 | 50 |
| 22.5 m | 25 | 25 | 0 |
| 30.0 m | 50 | 0 | 0 |
| 40.0 m | 50 | 0 | 0 |

212  214  216  218

AUTOMATIC TRIANGLE ORIENTATION DETECTION ALGORITHM

RIGHTS OF THE GOVERNMENT

The invention described herein may be manufactured and used by or for the Government of the United States for all governmental purposes without the payment of any royalty.

CROSS-REFERENCE TO RELATED APPLICATIONS

This application is related to U.S. patent application Ser. No. 13/025,624, filed on even date herewith by Pinkus et al., and entitled "Automatic Landolt C Gap Detection Software Architecture for Image Quality Analysis" (AFD 1121), the disclosure of which is incorporated by reference herein in its entirety.

BACKGROUND OF THE INVENTION

The present invention relates to pattern and object recognition, and more particularly to a method for detecting an object in a digital image.

Over the years, there have been many methods developed to determine the image quality of an image-generating system such as a sensor/display combination. In most cases, the final consumer of the image produced is a human observer using their visual capability to extract visual information from the displayed image. In recent years, imaging systems and image manipulation have moved from the analog world to the digital world, which has probably added a bit more confusion to the issue of image quality or resolution.

In general, resolution is the ability of a sensor/display system to produce detail; the higher the resolution, the finer the detail that can be displayed. With the advent of digital imagery and sensor detectors that are composed of an array of discrete elements, it is tempting, and not entirely wrong, to characterize the resolution of the system by the number of picture elements (pixels) for the display or sensor elements in the case of the sensor. For example, VGA resolution for a computer display is 480 elements high by 640 elements wide and SVGA is 600×800 elements. This describes the number of samples that can be displayed; however, the number of pixels alone says nothing of the quality of the actual display medium characteristics (luminance, contrast capability, noise, color, refresh rate, active area to total area ratio, etc.) or of the signal/information used to feed the individual pixels. Nevertheless, this numerical value of pixel or sensor element count is often given as a primary metric to the resolution (quality) of the sensor or display.

Another common approach to determining the resolution of a sensor/display system is to image an appropriate resolution test target and determine the smallest sized critical test pattern element that can be seen by a human observer. Many test patterns have been developed over the years such as grating, tri-bars, tumbling Es, the Snellen chart, and the Landolt C chart to test vision or to test imaging systems using vision. The test pattern typically has test elements of various sizes so that the human observer can pick out the smallest size that they can resolve. An alternative to the multi-sized test pattern is to use a single size test element, but image it at various distances until a distance is obtained at which the test object is barely resolved.

Related to resolution is visual acuity, which is acuteness or clearness of vision that is dependent on the sharpness of the retinal focus within the eye and the sensitivity of the interpretative faculty of the brain. For example, numerous methods have been used to determine night vision goggle ("NVG") visual acuity such as limiting resolution, Snellen Acuity, square wave targets, Landolt Cs, adaptive psychophysical, and directly measuring the psychometric function or the "frequency of seeing" curve. Each method produces a number that is composed of an actual acuity value plus error. There can be many sources of error but the largest is generally the method itself as well as the inherent variability of the observer while working under threshold conditions. Observer variability may be reduced through extensive training, testing the same time every day, and shortened sessions in order to reduce eye fatigue. Additionally, even though observers are given specific instructions, response criteria may also vary among or within observers; even over the course of a single experimental session. To assist in eliminating the criteria problem, a four alternative forced-choice paradigm was developed and utilized to measure the entire psychometric function. This paradigm allowed for any desired response criteria level (e.g., 50% or 75% corrected for chance, probability of detection) to be selected for the prediction of (NVG) visual acuity performance. Although all of the preceding was directed at visual acuity/resolution assessment of night vision goggles using multiple human observers the "resolution" concept applies equally well to digital imagery.

Current and future military weapons systems (e.g. micro UAVs, satellites, surveillance, weapons aiming optics, day/night head-mounted devices) will increasingly rely on digitally-based multi-spectral imaging capabilities. With digital media comes the potential to register, fuse, and enhance digital images whether they are individual images or streaming video gathered in real-time. Multi-spectral fusion and enhancement provides the greatly increased potential to detect, track, and identify difficult targets, such as those that are camouflaged, buried, hidden behind a smoke screen or obscured by atmospheric effects (haze, rain, fog, snow).

There are several different conventional techniques to assess the relative improvement in image quality when an image-enhancing algorithm has been applied to a digital image. The testing of enhancing effects often consists of subjective quality assessments or measures of the ability of an automatic target detection program to find a target before and after an image has been enhanced. It is rare to find studies that focus on the human ability to detect a target in an enhanced image using scenarios that are relevant for the particular application for which the enhancement is intended. While a particular algorithm may make an image appear substantially better after enhancement, there is no indication as to whether this improvement is significant enough to improve human visual performance.

Therefore, there is a need in the art to automatically assess image quality in terms of modeled human visual resolution perceptual qualities (i.e., the "frequency of seeing" curve) but without the need to actually use human observers.

SUMMARY OF THE INVENTION

Embodiments of the invention address the need in the art by providing a method of detecting a target image, and in particular a triangle having a particular orientation. A plurality of ring contour images is created by blurring the image, posterizing the blurred image at a plurality of levels to generate a plurality of posterized images, and creating the plurality of ring contour images from each of the plurality of posterized images. Additionally, a plurality of convex hull images is created by creating a plurality of corner images from corners within the image located by at least two different corner algorithms, finding a bounding rectangle that encompasses the plurality of ring contour images, cropping the plurality of corner images using the bounding rectangle, applying a threshold to the plurality of cropped corner images, and creating the plurality of convex hull images by generating a convex hull from the corners in each of the plurality of cropped corner images. From these sets of images a plurality of triangles is created by fitting a triangle with an orientation to each of the plurality of ring contour images and each of the plurality of convex hull images. Finally, the orientation of the triangle is determined from the plurality of triangles.

In some embodiments, and prior to creating the plurality of ring contour images and the plurality of convex hull images, the image may be prepared by first enlarging the image. The enlarged image may then be cropped to a target area of interest in the image to assist in reducing computation and processing times. The cropped image is then denoised and sharpened utilizing standard denoise and sharpening algorithms as known in the art.

In some embodiments, the plurality of ring contour images is created from each of the plurality of posterized images. The approximate center of the blurred image is determined. A start point is located on a color boundary. The color boundary is then traversed from the start point to generate a contour. If the traversal of the color boundary ends on the start point and if the resulting contour encloses the approximate center of the blurred image, a ring contour image is created including the contour.

In some embodiments, triangles are fit to each of the plurality of ring contour images and each of the plurality of convex hull images by first retrieving a contour from an image of the plurality of contour images or a convex hull from an image of the plurality of convex hull images. A triangle in a first orientation is fit to the contour or convex hull. If the triangle in the first orientation does not encompass the contour or convex hull, the triangle in the first orientation is enlarged until it does encompass the contour or convex hull. A triangle in a second orientation is also fit to the contour or convex hull. Similarly, if the triangle in the second orientation does not encompass the contour or convex hull, the triangle in the second orientation is enlarged until it does encompass the contour or convex hull. In some embodiments, additional orientations of triangles may be fitted to the contour and complex hull. Finally, the smaller of the triangles fit to the contour or convex hull is selected.

In some embodiments, the orientations of the triangles may include the triangle being oriented in an upward direction, a downward direction, a rightward direction, a leftward direction, and combinations thereof. In a specific embodiment, the orientation of the triangle is determined from the plurality of triangles by selecting an orientation corresponding to a majority of the plurality of triangles.

Embodiments of the invention also provide an apparatus having a processor and program code. The program code is configured to be executed by the processor to detect an image. The program code is further configured to create a plurality of ring contour images by blurring the image, posterizing the blurred image at a plurality of levels to generate a plurality of posterized images, and creating the plurality of ring contour images from each of the plurality of posterized images. The program code is further configured to create a plurality of convex hull images by creating a plurality of corner images from corners within the image located by at least two different corner algorithms, finding a bounding rectangle that encompasses the plurality of ring contour images, cropping the plurality of corner images using the bounding rectangle, applying a threshold to the plurality of cropped corner images, and creating the plurality of convex hull images by generating a convex hull from the corners in each of the plurality of cropped corner images. The program code is further configured to create a plurality of triangles by fitting a triangle with an orientation to each of the plurality of ring contour images and each of the plurality of convex hull images. And finally the program code is further configured to determine the orientation of the triangle from the plurality of triangles.

Embodiments of the invention additionally provide a program product including a computer recordable type medium and a program code configured to detect an image. The program code is resident on the computer recordable type medium and further configured, when executed on a hardware implemented processor, to create a plurality of ring contour images by blurring the image, posterizing the blurred image at a plurality of levels to generate a plurality of posterized images, and creating the plurality of ring contour images from each of the plurality of posterized images. The program code is further configured to create a plurality of convex hull images by creating a plurality of corner images from corners within the image located by at least two different corner algorithms, finding a bounding rectangle that encompasses the plurality of ring contour images, cropping the plurality of corner images using the bounding rectangle, applying a threshold to the plurality of cropped corner images, and creating the plurality of convex hull images by generating a convex hull from the corners in each of the plurality of cropped corner images. The program code is further configured to create a plurality of triangles by fitting a triangle with an orientation to each of the plurality of ring contour images and each of the plurality of convex hull images. And finally the program code is further configured to determine the orientation of the triangle from the plurality of triangles.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

Embodiments of the invention address the need in the art by providing a software architecture and procedure that allow automatic detection of digital images and quality using only a computer. This is in contrast to either simple "before" and "after" subjective visual comparisons or laborious and costly psychophysical procedures requiring extensive testing of multiple trained observers who are required to view and correctly judge the different orientation of many differently sized stimuli such as Landolt Cs or triangles. Embodiments of the invention utilize a software-implemented automatic Triangle Orientation Detection ("TOD") model, which has been designed to produce a similar frequency of seeing function as those produced by real observers. Thus, the variations among different multispectral sensors as well as image registration, fusion, and/or enhancement algorithms can be relatively quickly, accurately, and automatically assessed in terms of human visual perception but without the need for human observers.

Figure 1:
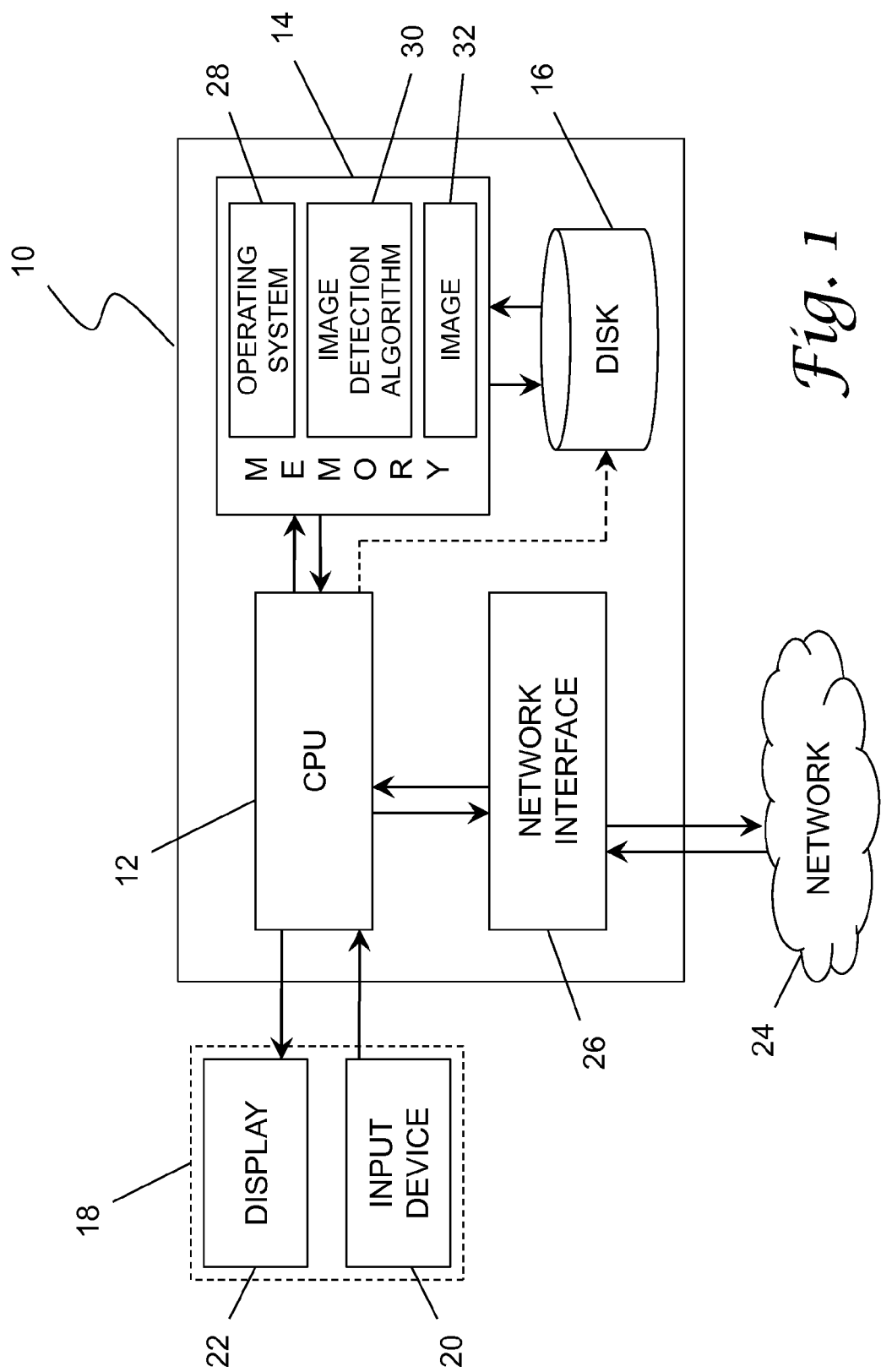
FIG. 1 is a schematic block diagram of an exemplary hardware and software environment for a computer system suitable for implementing an algorithm to detect images consistent with embodiments of the invention.

Turning to the drawings, wherein like numbers denote like parts throughout the several views, FIG. 1 illustrates an exemplary hardware and software environment for an apparatus 10 suitable for implementing an image quality assessment system consistent with embodiments of the invention. For the purposes of the invention, apparatus 10 may represent practically any type of computer, computer system or other programmable electronic device, including a client computer, a server computer, a portable computer, a handheld computer, an embedded controller, etc. Moreover, apparatus 10 may be implemented using one or more networked computers, e.g., in a cluster or other distributed computing system. Apparatus 10 will hereinafter also be referred to as a "computer," although it should be appreciated that the term "apparatus" may also include other suitable programmable electronic devices consistent with embodiments of the invention.

Computer 10 typically includes a central processing unit (CPU) 12 including one or more microprocessors coupled to a memory 14, which may represent the random access memory (RAM) devices comprising the main storage of computer 10, as well as any supplemental levels of memory, e.g., cache memories, non-volatile or backup memories (e.g., programmable or flash memories), read-only memories, etc. In addition, memory 14 may be considered to include memory storage physically located elsewhere in computer 10, e.g., any cache memory in a processor in CPU 12, as well as any storage capacity used as a virtual memory, e.g., as stored on a mass storage device 16 or on another computer coupled to computer 10.

Computer 10 also typically receives a number of inputs and outputs for communicating information externally. For interface with a user or operator, computer 10 typically includes a user interface 18 incorporating one or more user input devices 20 (e.g., a keyboard, a mouse, a trackball, a joystick, a touchpad, and/or a microphone, among others) and a display 22 (e.g., a CRT monitor, an LCD display panel, and/or a speaker, among others). Otherwise, user input may be received via another computer or terminal, e.g., via a client or single-user computer (not shown) coupled to computer 10 over a network 24. This latter implementation may be desirable where computer 10 is implemented as a server or other form of multi-user computer. However, it should be appreciated that computer 10 may also be implemented as a standalone workstation, desktop, laptop, hand-held, or other single-user computer in some embodiments.

For non-volatile storage, computer 10 typically includes one or more mass storage devices 16, e.g., a floppy or other removable disk drive, a hard disk drive, a direct access storage device (DASD), an optical drive (e.g., a CD drive, a DVD drive, etc.), flash memory data storage devices (USB flash drive) and/or a tape drive, among others. Furthermore, computer 10 may also include an interface 26 with one or more networks 24 (e.g., a LAN, a WAN, a wireless network, and/or the Internet, among others) to permit the communication of information with other computers and electronic devices. It should be appreciated that computer 10 typically includes suitable analog and/or digital interfaces (e.g., BUS) between CPU 12 and each of components 14, 16, 18, and 26, as is well known in the art.

Computer 10 operates under the control of an operating system 28, and executes or otherwise relies upon various computer software applications, components, programs, objects, modules, data structures, etc. For example, an image detection algorithm 30 may be resident in memory 14 to analyze image 32 also in memory or alternately resident in mass storage 16. Moreover, various applications, components, programs, objects, modules, etc. may also execute on one or more processors in another computer coupled to computer 10 via the network 24, e.g., in a distributed or client-server computing environment, whereby the processing required to implement the functions of a computer program, such as the image detection algorithm 30, may be allocated to multiple computers over the network 24.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable signal bearing media used to actually carry out the distribution. Examples of computer readable media include but are not limited to recordable type media such as volatile and non-volatile memory devices, floppy and other removable disks, hard disk drives, magnetic tape, optical disks (e.g., CD-ROMs, DVDs, etc.), among others.

In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the exemplary environment illustrated in FIG. 1 is not intended to limit the present invention. Indeed, those skilled in the art will recognize that other alternative hardware and/or software environments may be used without departing from the scope of the invention.

Figure 2:
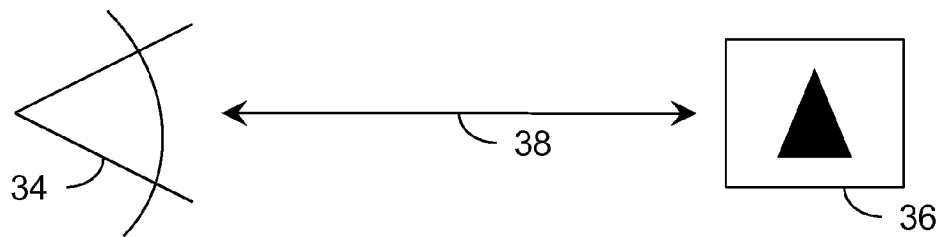
FIG. 2 illustrates a target image to be recognized at a distance from an observer or sensor to be used with the image detection algorithm.
Figure 3:
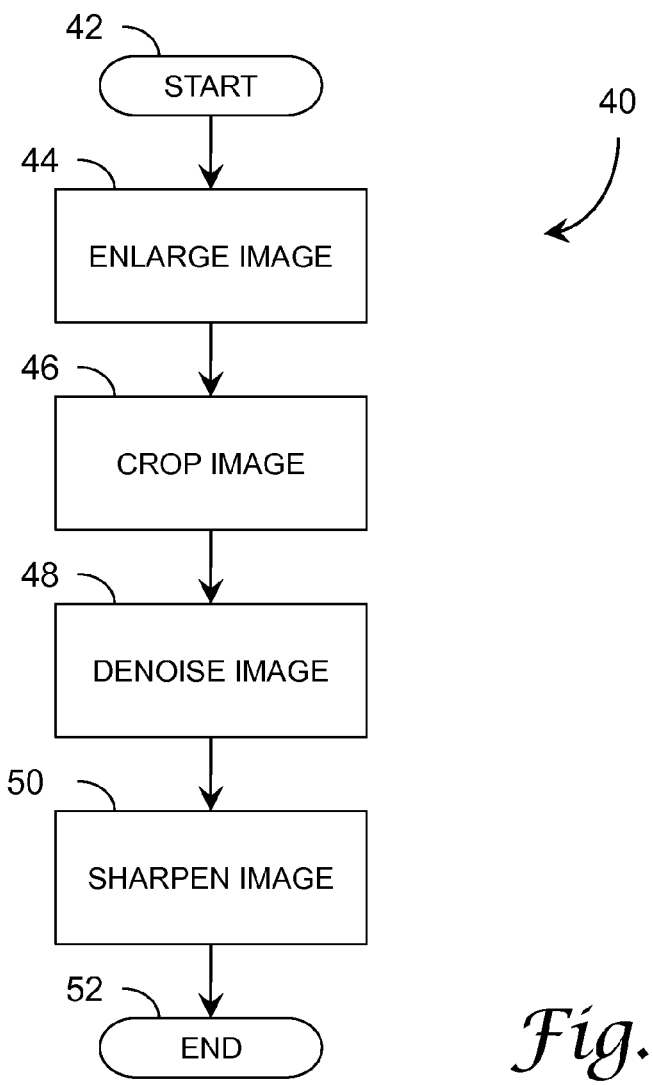
FIG. 3 is a flow chart illustrating the steps to prepare an image for the image detection algorithm.

Embodiments of the invention implement an algorithm 30 configured to detect Triangles as a resolution target. As illustrated in FIG. 2, a sensor, such as an Infrared (IR), Near Infrared (NIR), or Visual (VIS) sensor, 34 is directed at a target 36. Images 32 of the target 36 were acquired at multiple distances 38 from the sensor 34 to the target 36 as the method for probing the resolution of the sensor. As discussed above and in an alternate embodiment, the size of the Target 36 may also be adjusted, holding the distance 38 constant. Each of the images 32 is prepared as seen in the flowchart 40 in FIG. 3, prior to being analyzed. Turning now to FIG. 3, the process starts at block 42. The image is first enlarged at block 44, with the factor of enlargement being dependent on the sensor. For example, in a specific embodiment, the image 32 is enlarged by a factor of four. After the image is enlarged, the image is cropped around an area of interest at block 46 to assist in reducing the amount of computation time necessary to analyze the image. In a specific embodiment with a sensor having a resolution of 640×480, the image may be cropped to a size of 180×120, which is sufficient to encompass the target 36. The image is then sent through a denoising algorithm (block 48) and a sharpening algorithm (block 50). Any standard denoise and sharpen algorithm as are known to those of ordinary skill in the art may be used for blocks 48 ad 50. The process ends at block 52.

Figure 4:
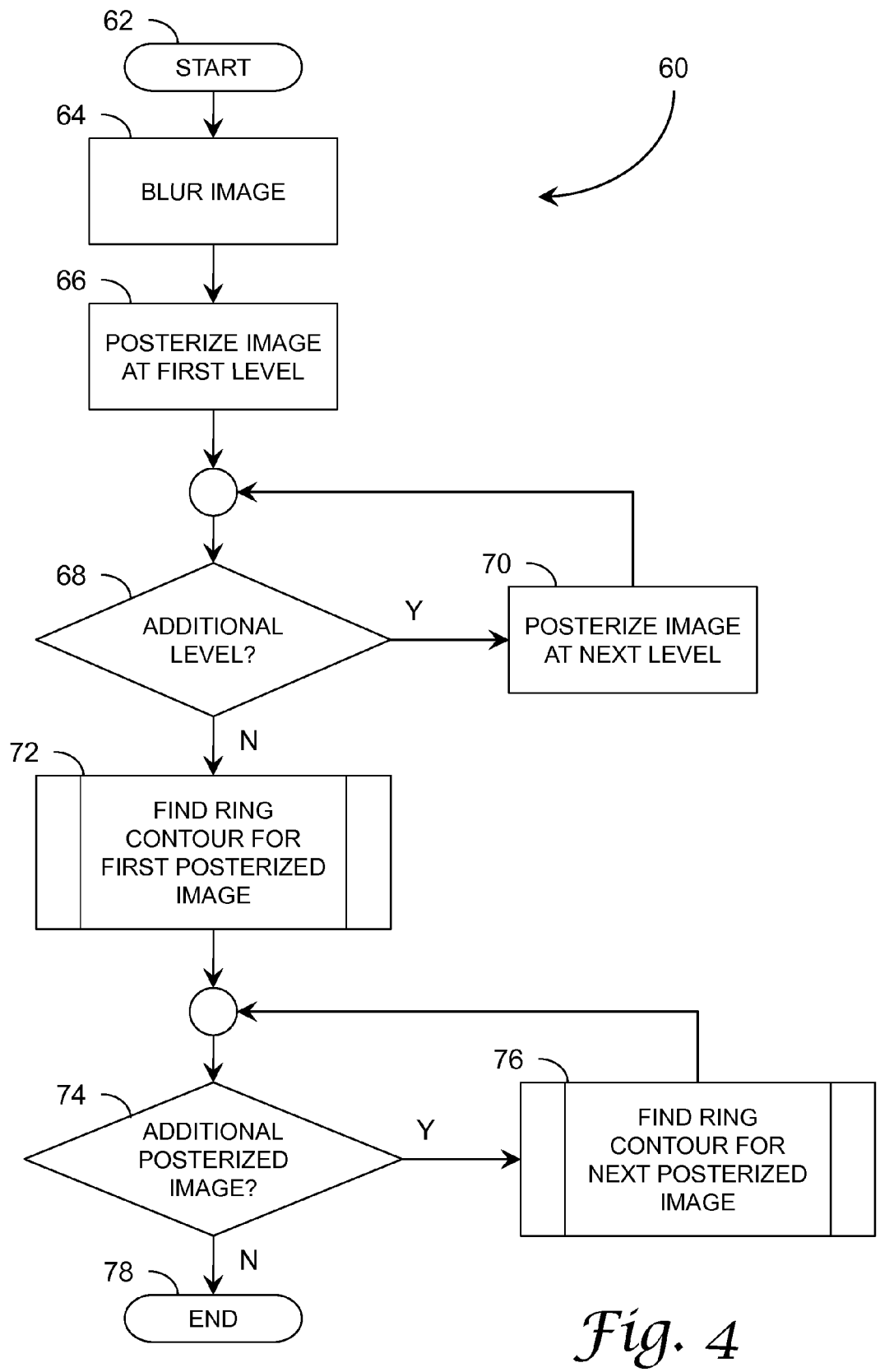
FIG. 4 is a flow chart illustrating a portion of the image detection algorithm.

The algorithm associated with embodiments of the invention then uses two different methods to identify and locate the target 36 in the prepared image. The first method finds contours that are then used to identify and locate the target 36. The second method finds potential corners of the target 36 that are then used to identify and locate the target 36. While the description of these methodologies may suggest that they be performed serially, there is a potential in each of the methodologies for a parallel implementation as well. Beginning first with the contour methodology and turning now to flowchart 60 in FIG. 4, the process starts at block 62. The image is blurred at block 64. In some embodiments, the image may be blurred using a Gaussian kernel of size ranging from about 5 to about 15. In a particular embodiment, a Gaussian kernel of size 11 was used. The blurred image is then posterized at block 66.

Initially the image is posterized at level 2 creating an image of only black and white pixels. Additional levels of posterizing may also be included for some embodiments, with the posterizing level increasing for each subsequent level. For example, in some embodiments, up to seven posterizing levels (2,3,4,5,6,7,8) may be used, though other embodiments may use fewer posterized levels. While it was determined that posterized levels in excess of about seven did not add any appreciable advantage, additional posterized levels past seven may be utilized. If additional posterized levels are available ("YES" branch of decision block 68), then the blurred image is posterized at the next level at block 70. Otherwise, if there are no additional levels ("NO" branch of decision block 68), then contours are determined for the first posterized image at block 72. If there are additional posterized images ("YES" branch of decision block 74), then contours are determined for the next posterized image at block 76 until all images are processed. If there are no additional posterized images ("NO" branch of decision block 74), then the process ends at block 78.

Figure 5:
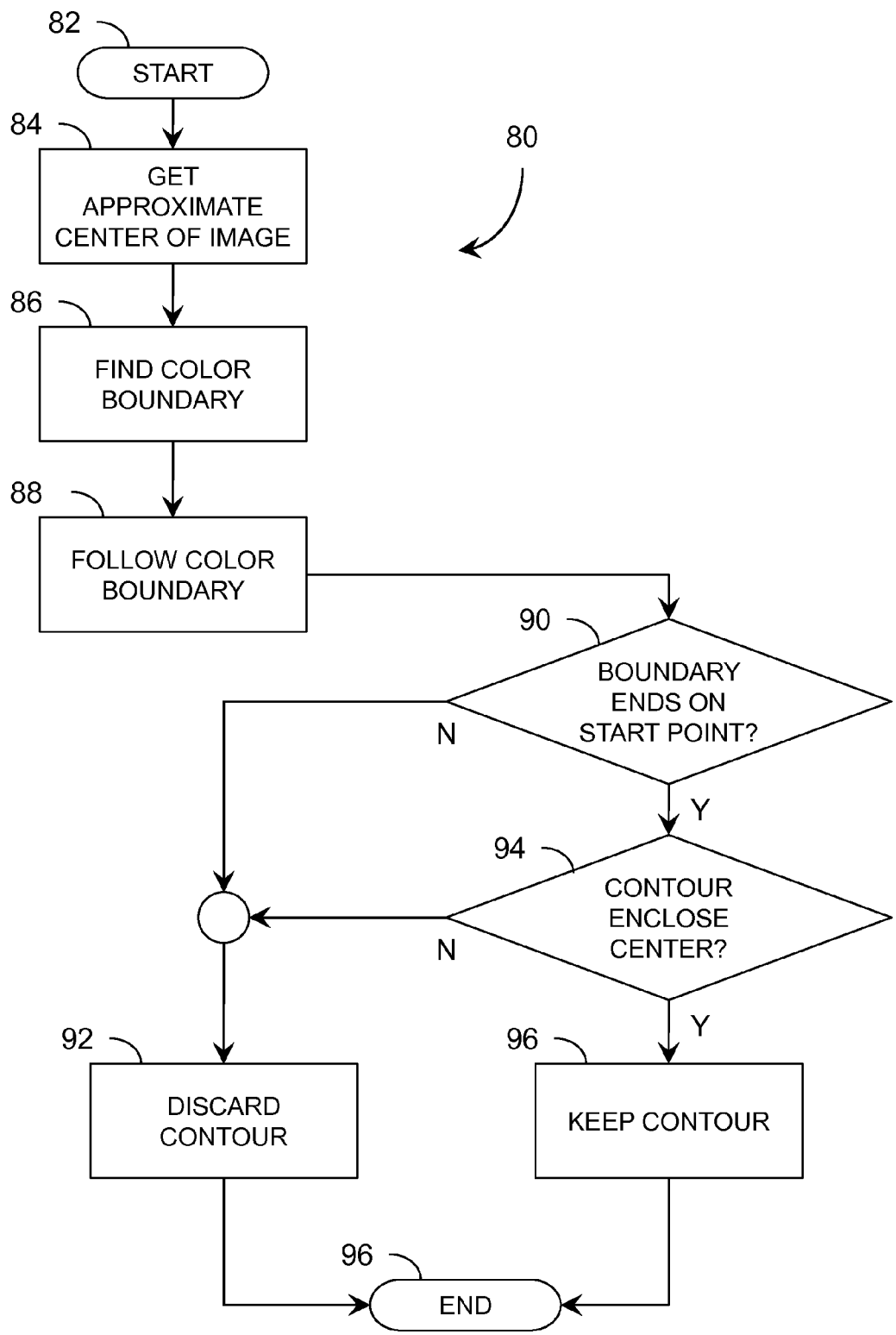
FIG. 5 is a flow chart illustrating a portion of the image detection algorithm.

In some embodiments and as seen in flowchart 80 in FIG. 5, the pixel boundaries of the posterized images are used to determine contour lines of the posterized image. The process begins at block 82. An approximate center of the image is determined at block 84. A color boundary is located at block 86. In some embodiments that image 32 is a grey scale image with pixel values ranging from 0 (black) to 255 (white), and for simplicity, this algorithm will be further described with reference to grey scale images, though other embodiments may employ a full color palate. The boundary is then traversed in a counter-clockwise direction at block 88, though in other embodiments a clockwise direction may be used.

If the boundary being traversed for the contour does not end at the point where the traverse started ("NO" branch of decision block 90), i.e. and open contour, the contour is discarded at block 92. If the contour does end on at the point where the traverse started ("YES" branch of decision block 90), then a check is made to determine if the contour encloses the center of the image. If the contour does not enclose the center of the image ("NO" branch of decision block 94), then the contour is discarded at block 92. Otherwise, if the contour does enclose the center of the image ("YES" branch of decision block 94), the then contour is kept at block 96 for further processing. The process ends at block 96 after either keeping or discarding the contour. The process of following the boundary to determine contours may be performed multiple times to capture each contour when multiple color boundaries are present in the image.

Figure 6:
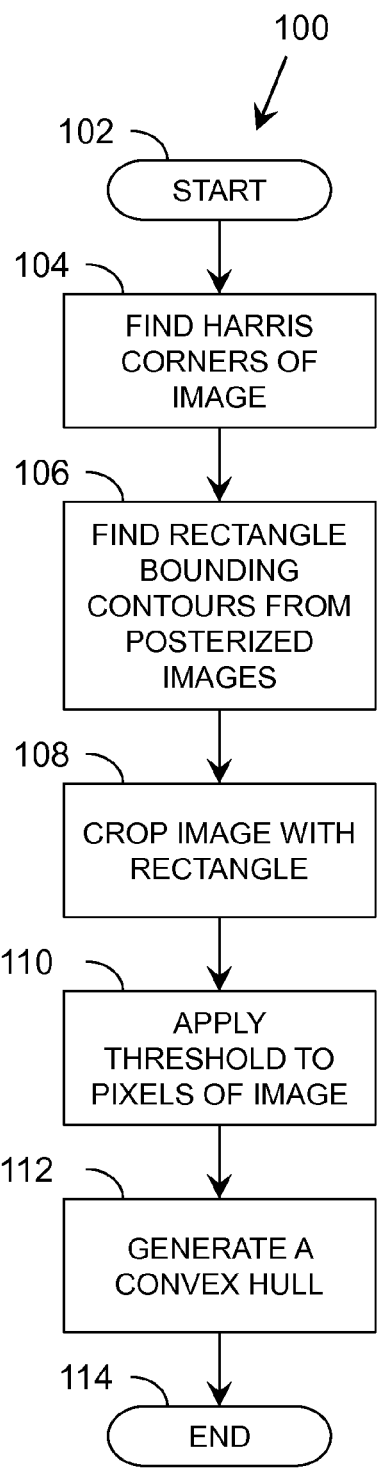
FIG. 6 is a flow chart illustrating a portion of the image detection algorithm.
Figure 7:
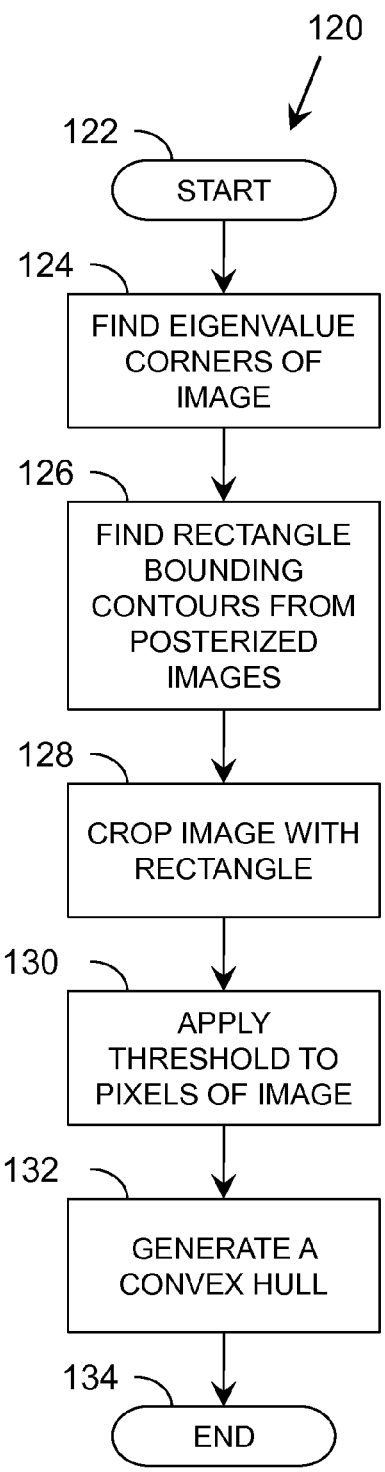
FIG. 7 is a flow chart illustrating a portion of the image detection algorithm.

Before completing the analysis with the contours determined above, the second method utilizing corners of the target 36 is set out in FIGS. 6 and 7. Starting with the flowchart 100 in FIG. 6, the process begins at block 102. Instead of blurring the image 32 as was done for the contours above, a Harris Corners algorithm as is known in the art is used to determine the corners in the image 32 at block 104. The Harris corners algorithm may produce stray corners or real unwanted corners in the image. To assist in reducing the corners to only those of the target 36, the image is cropped. To assist with the cropping, in some embodiments, the contour images above are combined into a single image and a bounding rectangle is determined which encompasses all of the contours at block 106. In a specific embodiment, the contour images are combined using a logical OR function, though other methods of combining the images into a single image may also be used. The bounding rectangle is now used to crop the Harris corner image in block 108. In one embodiment, the cropping of the image is accomplished using a logical AND function. A threshold ranging from about 32 to about 96 is applied to the cropped image to better define the corners in block 110. In a particular embodiment, a threshold value of 64 is used, where any pixel values below 64 become black and any pixel values above 64 become white. A convex hull is then generated connecting each of the corners loaded in block 112. The process ends at block 114.

Similarly, and as seen in flowchart 120 in FIG. 7, the process starts at block 122. Instead of blurring the image or using the Harris corners algorithm, an eigenvalue corners algorithm as known in the art is utilized in order to determine the corners of the image 32 at block 124. The rectangle used above to crop the Harris corner image is also found at block 126 and used to also crop the eigenvalue corner image at block 128. The same threshold is applied to the cropped image at block 130 and a convex hull is generated through each of the corner points at block 132. The process ends at block 134.

Figure 8:
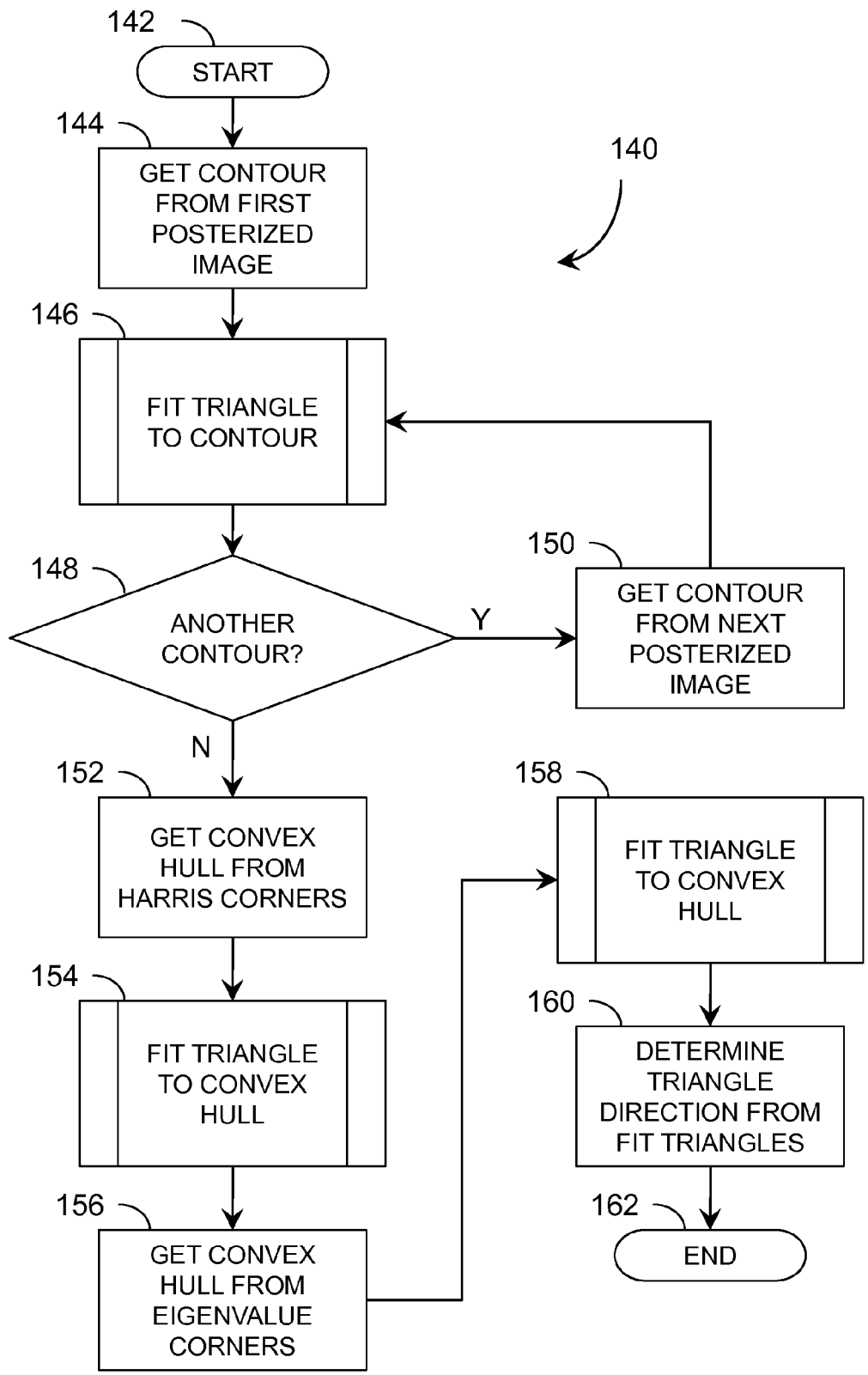
FIG. 8 is a flow chart illustrating a portion of the image detection algorithm.

Now that each of the images containing either contours or convex hulls is generated, triangles may be fit to each of the images which will then be used to determine the location and orientation of the target triangle 36. Specifically, and with reference to flowchart 140 in FIG. 8, the process begins at block 142. The contour image generated from the first posterized image is retrieved in block 144 and an equilateral triangle oriented either upward, downward, to the left, or to the right is fit to the determined contour in block 146. If there are additional contour images from additional posterized images ("YES" branch of decision block 148), then those contoured images are received in block 150 and an equilateral triangle oriented either upward, downward, to the left, or to the right is fit to the determined contour in block 146. If there are no further contoured images ("NO" branch of decision block 148), then the convex hull generated from the Harris corners is retrieved at block 152. An equilateral triangle oriented either upward, downward, to the left, or to the right is fit to the convex hull in block 154. Similarly, the convex hull from the eigenvalue corners is retrieve at block 156. An equilateral triangle oriented either upward, downward, to the left, or to the right is fit to the convex hull in block 158. Finally, all of the fit triangles are analyzed to determine the orientation of the triangle in the target 36 at block 160. In some embodiments, this orientation may be determined by the majority of the triangles oriented in the same direction. In other embodiments, other methods for determination may be used. The process ends at block 162.

Figure 9:
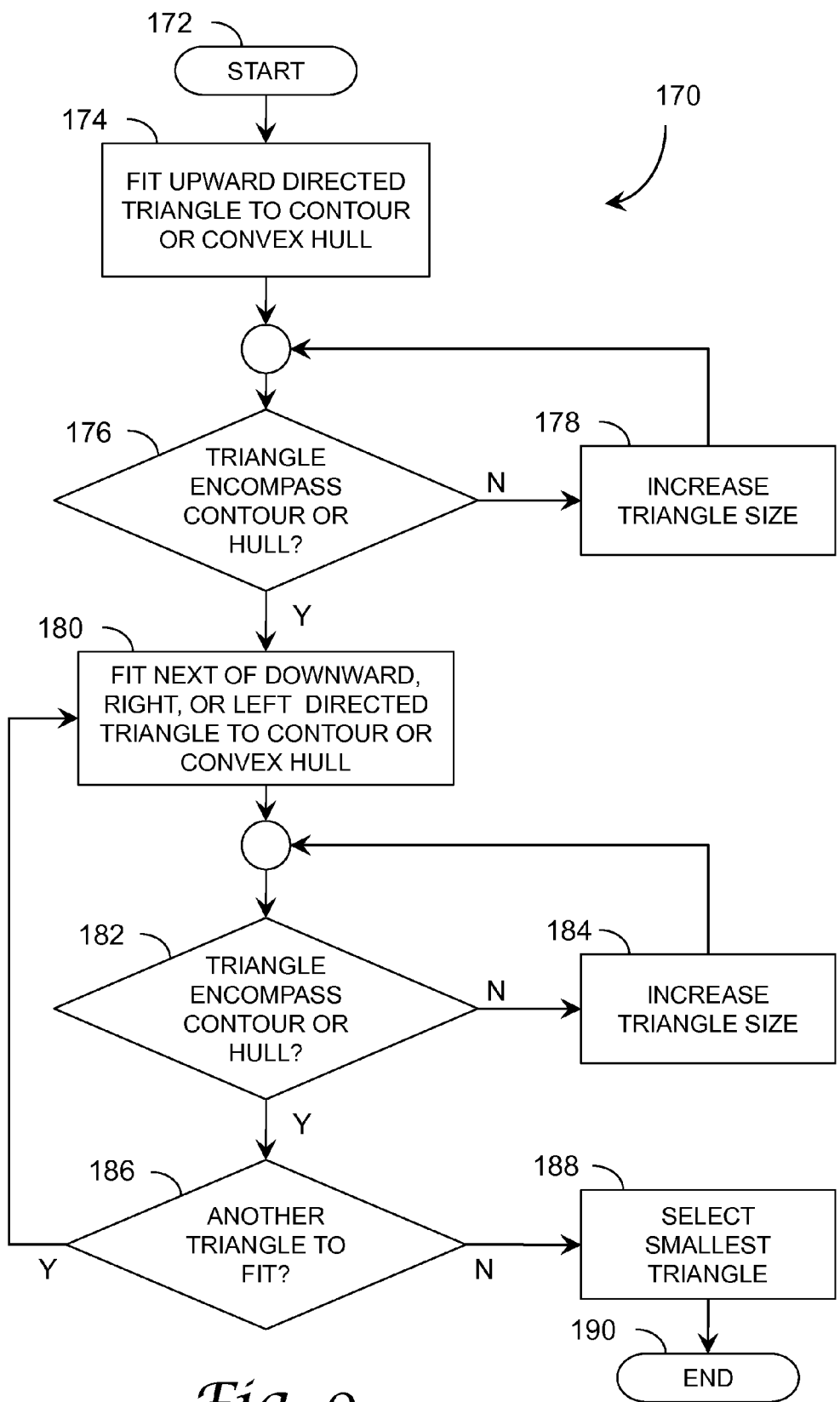
FIG. 9 is a flow chart illustrating a portion of the image detection algorithm.

In order to fit the triangles in some embodiments, and as shown in flowchart 170 in FIG. 9, each of the four orientations is tried with the best orientation being selected. The process starts at block 172. An upward directed triangle is fit to the contour or convex hull in block 176. If the triangle does not encompass the contour or the convex hull ("NO" branch of decision block 176), then the size of the triangle is increased at block 178 until the triangle does encompass the contour or convex hull. If the triangle does encompass the contour or convex hull ("YES" branch of decision block 176), then the next triangle selected from a downward directed, right directed, or left directed triangle is fit to the contour or convex hull at block 180. If this triangle does not encompass the contour or convex hull ("NO" branch of decision block 182) then the size of the triangle is increased at block 184 until the triangle does encompass the contour or convex hull. If the triangle does encompass the contour or convex hull ("YES" branch of decision block 182) then the process repeats at block 180 until all four orientations of the triangle have been fit. If there are no other triangles to fit ("NO" branch of decision block 186), then the smallest of the four triangles is selected for the contour or convex hull at block 188. The process ends at block 190.

Figures 10, 11:
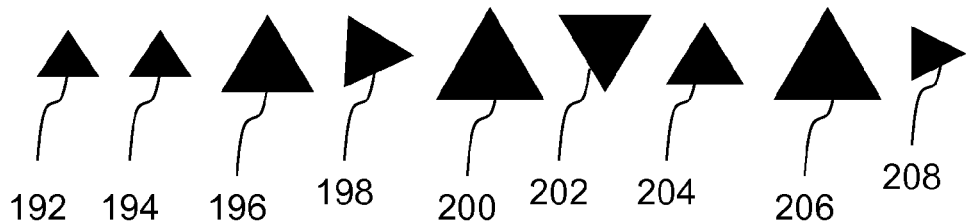
FIG. 10 illustrates a set of exemplary results from the image detection algorithm used to select the final image orientation.
FIG. 11 is a table representing results from images acquired from various sensors at various distances.
Figure 12:
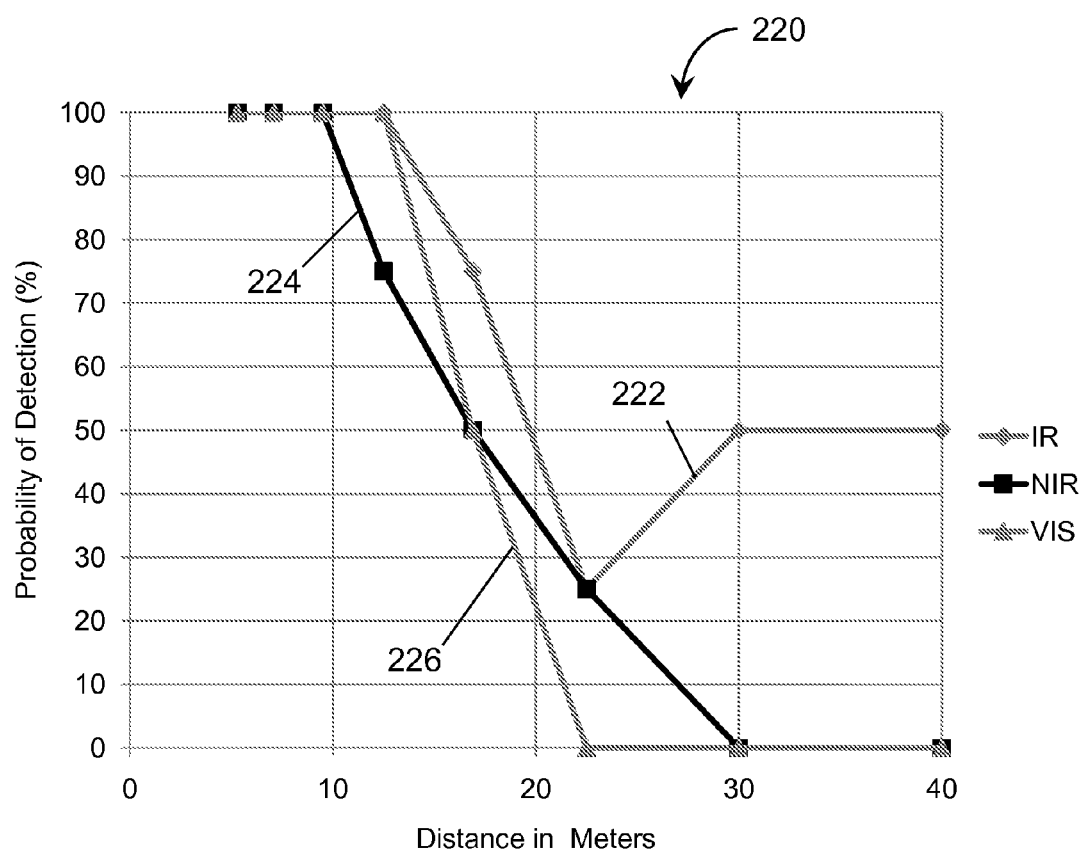
FIG. 12 is a graph of the data in the table in FIG. 11.

FIG. 10 illustrates an example of the triangles 192-208 that may have been fit for a particular embodiment having seven contoured images with the Harris and eigenvalue corner images, resulting in nine triangles. As set forth above with respect to flowchart 140 in FIG. 8, six 192, 194, 196, 200, 204, 206 of the nine triangles 192-208 are oriented in a upward direction. Based on that majority, the determination from the image detection algorithm is that the triangle in the target 36 is an upward directed triangle. The table in FIG. 11 illustrates exemplary data 214, 216, 216 for images generated respectively by an IR, NIR, and VIS sensor at several distances 212. A series of images from each of these sensors may be generated at each of the distances 212 and evaluated with the image detection algorithm set out above. The results (in percentage correct) 214-218 may be determined based on the output of the algorithm and the actual orientation of the target 36. This data can then be plotted on graph 220 as illustrated in FIG. 12 showing "frequency of seeing" curves 222, 224, 226 for each of the respective IR, NIR, and VIS sensors.

This data may now be used as an initial screening of sensors in order to reduce the number sensors to a select few that may then be subjected to testing by multiple human observers. Alternately, the data may then be used as a "quick and dirty" evaluation of a number of sensors to assist in selecting a sensor when the funding or time does not permit an exhaustive test by human observers. Furthermore, the data can be used to evaluate digital images combined, overlaid, or otherwise enhanced to again limit the combinations before presenting these enhanced images to actual human observers. Additionally, the triangle detection algorithm may also be used in conjunction with other image detection algorithms, such as a Landolt C recognition algorithm as discussed in co-pending U.S. application Ser. No. 13/025,624. The use of multiple detection algorithms may present a better evaluation of a sensor or image resolution or quality.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A method of detecting an image, the method comprising:
creating a plurality of ring contour images by:
blurring the image;
posterizing the blurred image at a plurality of levels to generate a plurality of posterized images; and
creating the plurality of ring contour images from each of the plurality of posterized images;
creating a plurality of convex hull images by:
creating a plurality of corner images from corners identified within the image located by at least two different corner algorithms;
finding a bounding rectangle that encompasses the plurality of ring contour images;
cropping the plurality of corner images using the bounding rectangle;
applying a threshold to the plurality of cropped corner images; and creating the plurality of convex hull images by generating a convex hull from the corners in each of the plurality of cropped corner images;
creating a plurality of triangles by fitting a triangle with an orientation to each of the plurality of ring contour images and each of the plurality of convex hull images; and
determining the orientation of the triangle from the plurality of triangles.

2. The method of claim 1, further comprising:
prior to creating the plurality of ring contour images and the plurality of convex hull images, preparing the image by:
enlarging the image;
cropping the enlarged image to an area of interest;
denoising the cropped image; and
sharpening the cropped, denoised image.

3. The method of claim 2, wherein the image is enlarged by a factor of 4.

4. The method of claim 1, wherein the blurred image is posterized at up to 7 levels.

5. The method of claim 1, wherein the plurality of corner images are generated using a Harris corner algorithm and an eigenvalue corner algorithm.

6. The method of claim 1, wherein the threshold applied to the plurality of cropped corner images is between 32 and 96.

7. The method of claim 1, wherein creating the plurality of ring contour images from each of the plurality of posterized images comprises:
determining an approximate center of the blurred image;
locating a start point on a color boundary;
traversing the color boundary from the start point to generate a contour; and
in response to the traversal of the color boundary ending on the start point and the contour enclosing the approximate center of the blurred image, creating a ring contour image including the contour.

8. The method of claim 1, wherein fitting the triangle with the orientation to each of the plurality of ring contour images and each of the plurality of convex hull images comprises:
retrieving a contour from an image of the plurality of contour images or a convex hull from an image of the plurality of convex hull images;
fitting a triangle in a first orientation to the contour or convex hull;
in response to the triangle in the first orientation not encompassing the contour or convex hull, enlarging the triangle in the first orientation;
fitting a triangle in a second orientation to the contour or convex hull;
in response to the triangle in the second orientation not encompassing the contour or convex hull, enlarging the triangle in the second orientation; and
selecting the smaller of the triangle in the first orientation and the triangle in the second orientation.

9. The method of claim 8, wherein the first and second orientations are selected from a group consisting of: an upward direction, a downward direction, a rightward direction, a leftward direction, and combinations thereof.

10. The method of claim 8, further comprising:
fitting a triangle in a third orientation to the contour or convex hull;
in response to the triangle in the third orientation not encompassing the contour or convex hull, enlarging the triangle in the third orientation; and
selecting the smaller of the triangle in the first orientation, the triangle in the second orientation, and the triangle in the third orientation.

11. The method of claim 10, further comprising:
fitting a triangle in a fourth orientation to the contour or convex hull;
in response to the triangle in the fourth orientation not encompassing the contour or convex hull, enlarging the triangle in the fourth orientation; and
selecting the smaller of the triangle in the first orientation, the triangle in the second orientation, the triangle in the third orientation, and the triangle in the fourth orientation.

12. The method of claim 1, wherein determining the orientation of the triangle from the plurality of triangles comprises selecting an orientation corresponding to a majority of the plurality of triangles.

13. An apparatus comprising: a processor; and
a memory storing program code configured to be executed by the processor to detect an image, the program code further configured to create a plurality of ring contour images by blurring the image, posterizing the blurred image at a plurality of levels to generate a plurality of posterized images, and creating the plurality of ring contour images from each of the plurality of posterized images, the program code further configured to create a plurality of convex hull images by creating a plurality of corner images from corners within the image located by at least two different corner algorithms, finding a bounding rectangle that encompasses the plurality of ring contour images, cropping the plurality of corner images using the bounding rectangle, applying a threshold to the plurality of cropped corner images, and creating the plurality of convex hull images by generating a convex hull from the corners in each of the plurality of cropped corner images, the program code further configured to create a plurality of triangles by fitting a triangle with an orientation to each of the plurality of ring contour images and each of the plurality of convex hull images, and the program code further configured to determine the orientation of the triangle from the plurality of triangles.

14. The apparatus of claim 13, wherein the program code is further configured to:
prior to creating the plurality of ring contour images and the plurality of convex hull images, prepare the image by enlarging the image, cropping the enlarged image to an area of interest, denoising the cropped image, and sharpening the cropped, denoised image.

15. The apparatus of claim 13, wherein the program code is configured to posterize the blurred image at no more than 7 levels.

16. The apparatus of claim 13, wherein the program code is configured to generate the plurality of corner images using a Harris corner algorithm and an eigenvalue corner algorithm.

17. The apparatus of claim 13, wherein the program code is configured to create the plurality of ring contour images from each of the plurality of posterized images by:
determining an approximate center of the blurred image;
locating a start point on a color boundary;
traversing the color boundary from the start point to generate a contour; and
in response to the traversal of the color boundary ending on the start point and the contour enclosing the approximate center of the blurred image, creating a ring contour image including the contour.

18. The apparatus of claim 13, wherein the program code is configured to fit the triangle with the orientation to each of the plurality of ring contour images and each of the plurality of convex hull images by:
- retrieving a contour from an image of the plurality of contour images or a convex hull from an image of the plurality of convex hull images;
- fitting a triangle in a first orientation to the contour or convex hull;
- in response to the triangle in the first orientation not encompassing the contour or convex hull, enlarging the triangle in the first orientation;
- fitting a triangle in a second orientation to the contour or convex hull;
- in response to the triangle in the second orientation not encompassing the contour or convex hull, enlarging the triangle in the second orientation; and
- selecting the smaller of the triangle in the first orientation and the triangle in the second orientation.

19. The apparatus of claim 18, wherein the first and second orientations are selected from a group consisting of: an upward direction, a downward direction, a rightward direction, a leftward direction, and combinations thereof.

20. A program product, comprising:
- a non-transitory computer recordable type medium; and
- a program code configured to detect an image, the program code resident on the non-transitory computer recordable type medium and further configured when executed on a hardware implemented processor to create a plurality of ring contour images by blurring the image, posterizing the blurred image at a plurality of levels to generate a plurality of posterized images, and creating the plurality of ring contour images from each of the plurality of posterized images, the program code further configured to create a plurality of convex hull images by creating a plurality of corner images from corners within the image located by at least two different corner algorithms, finding a bounding rectangle that encompasses the plurality of ring contour images, cropping the plurality of corner images using the bounding rectangle, applying a threshold to the plurality of cropped corner images, and creating the plurality of convex hull images by generating a convex hull from the corners in each of the plurality of cropped corner images, the program code further configured to create a plurality of triangles by fitting a triangle with an orientation to each of the plurality of ring contour images and each of the plurality of convex hull images, and the program code further configured to determine the orientation of the triangle from the plurality of triangles.

\* \* \* \* \*